United States Patent
Odaohhara et al.

(10) Patent No.: US 6,288,522 B1
(45) Date of Patent: Sep. 11, 2001

(54) METHOD AND APPARATUS FOR CONTROLLING BATTERY CHARGING CURRENT

(75) Inventors: Shigefumi Odaohhara, Yamato; Keiji Suzuki, Fujisawa, both of (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/571,430

(22) Filed: May 15, 2000

(30) Foreign Application Priority Data

May 13, 1999 (JP) .................................................. 11-132847

(51) Int. Cl.[7] .................................................. H02J 7/00
(52) U.S. Cl. .......................................... 320/138; 320/137
(58) Field of Search ................................... 320/138, 137, 320/162, 156, 125; 307/64, 65, 80, 85

(56) References Cited

U.S. PATENT DOCUMENTS

| | | | |
|---|---|---|---|
| 5,886,424 | * | 3/1999 | Kim .......................... 307/64 |
| 5,969,438 | * | 10/1999 | Odaohara .................... 307/80 |
| 5,986,437 | * | 11/1999 | Lee ........................... 320/162 |
| 6,119,237 | * | 9/2000 | Cho ........................... 713/300 |

* cited by examiner

*Primary Examiner*—Peter S. Wong
*Assistant Examiner*—Lawrence Luk
(74) *Attorney, Agent, or Firm*—George E. Grosser; Andrew Dillon (57) ABSTRACT

A method and apparatus for controlling battery charging current selectively receive electrical power from either a first external power source or a second external power source and outputs part of the power source to a charger for charging a battery. A reference value supplying apparatus gives a first reference value equivalent to the output current capability of the first external power source when a charging-current controller is connected to the first external power source and gives a second reference value equivalent to the current capability of the second external power source when the charging-current controller is connected to the second external power source. A current detection circuit detects current that the charging-current controller receives from either the first external power source or the second external power source and a charging current control circuit controls a charging current in the charger so that the charging current does not exceed the first or second reference value detected by the current detection circuit.

13 Claims, 4 Drawing Sheets

METHOD AND APPARATUS FOR CONTROLLING BATTERY CHARGING CURRENT

BACKGROUND OF THE INVENTION

1. Technical Field

The present invention relates to battery chargers, and more particularly, to a charging-current controller for efficiently charging a rechargeable battery of a portable device where multiple external power sources are alternatively available.

2. Description of the Related Art

With the spread of mobile computing, portable personal computers (hereinafter referred to as portable PCs) of various sizes and functions have been developed. For example, there are notebook personal computers (PCs), sub-notebook PCs, palmtop PCs, PDAs (personal data assistants) or the like.

Portable PC's typically incorporate a battery within their main housing. This battery makes it possible for a user to use a portable PC in an environment where a line power source is not readily available. Typically, a rechargeable battery is used so that it may be charged and used repeatedly.

In an environment where a line power source can be utilized, the user connects an AC adapter (to which the line power alternating current is input and from which direct current is output) to the portable PC. With this power connection, it becomes possible for the portable PC to charge its incorporated secondary battery while the portable PC is operating.

Since the portable PC has limited space in its main housing, an expansion unit may be connected to the main housing to extend the functionality of the portable PC. This expansion unit is typically referred to as a docking station, a port replicator or the like.

Some expansion units incorporate a power source that may be driven by a line power source. If a portable PC is docked to an expansion unit incorporating a power source, the portable PC can take advantage of the power source incorporated in the expansion unit.

When an AC adapter is being connected to a portable PC, the rechargeable battery is charged by utilizing the AC adapter. When a portable PC is being docked to an expansion unit, the rechargeable battery is charged by utilizing the power source incorporated in the expansion unit.

An AC adapter is made small in size and light in weight because it is usually carried with a portable PC. The DC power that is output by the AC adapter, therefore, is restricted. On the other hand, an expansion unit can be made larger because it is usually placed on a desk to be used. Therefore, because the power source incorporated in the expansion unit can be made larger than the AC adapter, the expansion unit can output a higher DC current than that of the AC adapter.

Typically, a charger for charging the rechargeable battery incorporated in the portable PC is formed to conform to the AC adapter. For this reason, even when a portable PC is docked to the expansion unit so that it can receive a higher charging current than available from an AC adapter, a current for charging the rechargeable battery will be limited to the same value as provided by the AC adapter. Thus, even if a power source capable of supplying a larger power were connected to the portable PC, the larger power cannot be utilized to charge the rechargeable battery.

The present invention has been accomplished in order to solve the above-mentioned problem. Accordingly, it is an object of the present invention to provide a charging-current controller that is capable of efficiently charging a rechargeable battery in conformance with the capacity of a power source to be connected to a portable PC.

SUMMARY OF THE INVENTION

A method and apparatus for controlling battery charging-current includes a power input selectively connectable to one of multiple power sources, a charging output coupled to a rechargeable battery, a current detector for detecting a total current at the power input, and a control circuit coupled to the current detector for controlling charging current supplied from the charging output to the rechargeable battery. The charging current is controlled in response to a which of the power sources is connected, such that the total current is adjusted in conformity with the current capacity of the power source.

The above as well as additional objectives, features, and advantages of the present invention will become apparent in the following detailed description.

DETAILED DESCRIPTION OF ILLUSTRATIVE EMBODIMENT

In charging a rechargeable battery, a charging-current controller according to the present invention controls charging current such that, among a plurality of external power sources selectively coupled to the electronic apparatus, the current does not exceed the capacity of the particular external power source connected to the electronic apparatus. Therefore, since intrinsic power capacities of the plurality of external power sources can be sufficiently matched, a rechargeable battery can be charged more efficiently.

First Embodiment

Figure 1:
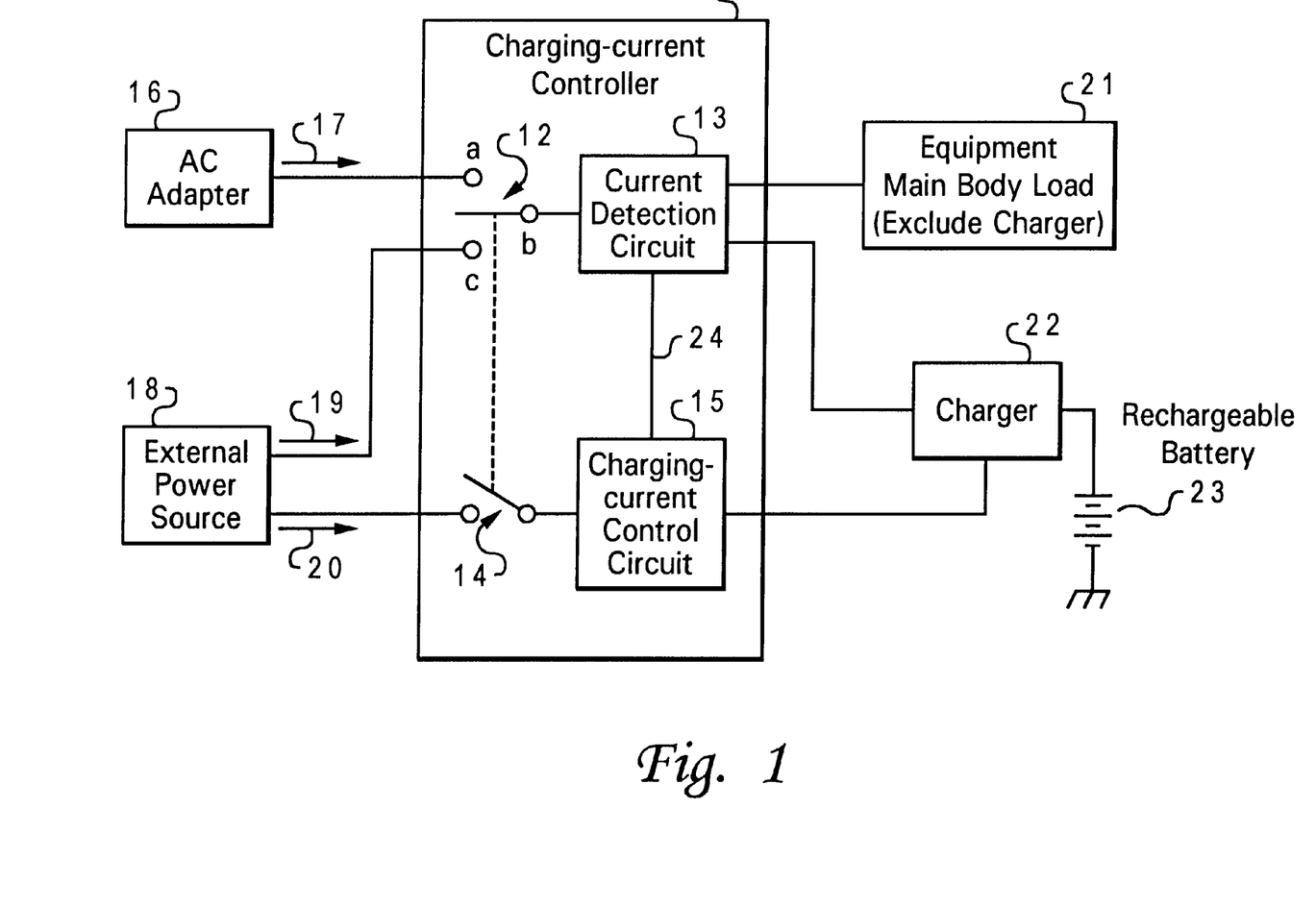
FIG. 1 is a block diagram depicting a portable PC having a charging-current controller in accordance with a first embodiment of the present invention.

With reference now to the figures, and in particular to FIG. 1, a block diagram depicting a portable PC having a charging-current controller in accordance with a first embodiment of the present invention. A charging-current controller 11 according to the first embodiment comprises power path control switch 12, a current detection circuit 13, signal connection means 14, and a charging-current control circuit 15.

One end of the power path control switch 12 is connected to the current detection circuit 13, while the other end is selectively connected to either an AC adapter 16 or an external power source 18 that is incorporated in an expansion unit. The power path control switch 12 has three states a, b, and c. In the state a, the power path control switch means 12 selects the AC adapter 16. In the state c, the power path control switch 12 selects the external power source 18 incorporated in an expansion unit. In the state b, the power path control switch 12 selects neither the AC adapter 16 nor the external power source 18. In this state, the portable PC is driven by a rechargeable battery 23.

The power path control switch 12 is realizable by an electronic circuit although it is expressed in FIG. 1 as a mechanical switch.

The power path control switch 12 may be a mechanical switch, for example, in the following circuit: The power path control switch 12 is divided into a DC jack and a DC plug. The DC jack is connected to the portable PC, while the DC plug is connected to one end of a power cord extending from the AC adapter 11. The place of the DC jack in the portable PC can be selected so that the DC jack is covered with an expansion unit when the portable PC is docked to the expansion unit. If done in this manner, there will be a need to remove the DC plug of the AC adapter 16 before the portable PC and the expansion unit are docked. As a result, it becomes possible for the power path control switch 12 to distinguish whether the power source for supplying power to the charging-current controller 11 is the AC adapter 16 or the external power source 18.

The power path control switch 12 is realizable by an electric circuit, for example, in the following manner: If the expansion unit and the portable PC are docked with each other, they are connected by a plurality of signal lines in addition to the power line. One of these signal lines is employed for detection of expansion unit connection. For instance, while the expansion unit is not docked, the above-mentioned signal line is set to a high level. If the expansion unit is docked, the above-mentioned signal line is made a low level. A switching transistor is provided between the AC adapter 16 and the current detection circuit 13. Another switching transistor is provided between the external power source 18 and the current detection circuit 13. When the above-mentioned signal line is high, the switching transistor provided between the AC adapter 16 and the current detection circuit 13 is turned on. If the above-mentioned signal line goes to a low level, the switching transistor provided between the AC adapter 16 and the current detection circuit 13 is turned off and the switching transistor provided between the external power source 18 and the current detection circuit 13 is turned on. With this, the power path control switch means 12 can switch between the AC adapter 16 and the external power source 18.

When the power path control switch means 12 is in position a, direct current 17 from the AC adapter 16 flows in the current detection circuit 13. When the power path control switch means 12 is in position c, direct current 19 from the external power source 18 flows in the current detection circuit 13. The current detection circuit 13 supplies direct current to a PC load 21 and a charger 22 and detects a direct current value passing therethrough. The direct current value detected by the current detection circuit 13 is sent to the charging-current control circuit 15. The main body load 21 does not include the load of the charger 22.

The signal connection 14 operates in interlock with the power path control switch means 12. When the power path control switch 12 is in the states a and b, the signal connection 14 is open. If the power path control switch 12 goes to the state c, the signal connection 14 is closed. If the signal connection 14 is closed, an external power connection signal 20 output by the external power source 18 is input to the charging-current control circuit 15. With this, the charging-current control circuit 15 can discriminate whether the AC adapter 16 is connected or the external power source 18 is connected.

The charging-current control circuit 15 outputs a control signal which controls direct current (charging current), which flows to the charger 22, to an optimal value in accordance with both the presence of the external power connection signal 20 output by the external power source 18 and the direct current value detected by the current detection circuit 13.

The charger 22 controls the direct current (charging current), which is input from the current detection circuit 13, by the control signal input from the charging-current control circuit 15. The charger 22 charges the rechargeable battery 23 by supplying the controlled charging current. The rechargeable battery 23 may be a lithium ion battery, or other rechargeable type.

The operation of the charging-current controller 11 is as follows: If the power path control switch means 12 is set to the state a, the direct current 17 from the AC adapter is supplied to the charging-current controller 11. The direct current 17 passes through the current detection circuit 13 and then drives the PC load 21 and the charger 22. At this time, the current detection circuit 13 detects the current value of the direct current 17 flowing therethrough. The detected current value 24 is transmitted to the charging-current control circuit 15.

The charging-current control circuit 15 controls the value of the charging current of the charger 22 so that the detected current value 24 does not exceed the maximum current value of the AC adapter 16. The charging-current control circuit 15 has the maximum current value of the AC adapter 16 as an initial value. If the detected current value 24 is less than the maximum current value of the AC adapter 16, the charging-current control circuit 15 causes the charger 22 to continue to charge the rechargeable battery 23. If the detected current value 24 is ready to exceed the maximum current value of the AC adapter 16, the charging-current control circuit 15 causes the charger 22 to vary the value of the current charging the rechargeable battery 23, thereby controlling the detected current value 24 so that the value 24 does not exceed the maximum current value of the AC adapter 16.

If the portable PC is docked to the expansion unit, the power path control switch means 12 is set to position c. Simultaneously, the signal connection 14 is closed. As a consequence, the direct current 19 is supplied from the external power source 18 to the charging-current controller 11. Simultaneously, the external power connection signal 20 output by the external power source 18 is input to the charging-current control circuit 15. The charging-current control circuit 15 to which the external power connection signal 20 has been input changes an initial value which is compared with the detected current value 24 to the maximum current value of the external power source 18. The maximum current value of the external power source 18 is normally greater than that of the AC adapter 16.

The direct current 19 passes through the current detection circuit 13 and then drives the main body load 21 and the charger 22. At this time, the current detection circuit 13 detects the current value of the direct current 17 flowing therethrough. The detected current value 24 is transmitted to the charging-current control circuit 15.

The charging-current control circuit 15 controls the value of the charging current of the charger 22 so that the detected current value 24 does not exceed the maximum current value of the external power source 18. The charging-current control circuit 15 has the maximum current value of the external power source 18 as a value changed from the initial value as described above. If the detected current value 24 is less than the maximum current value of the external power source 18, the charging-current control circuit 15 causes the charger 22 to continue to charge the rechargeable battery 23. If the detected current value 24 is ready to exceed the maximum current value of the external power source 18, the charging-current control circuit 15 causes the charger 22 to vary the value of the current charging the rechargeable battery 23, thereby controlling the detected current value 24 so that the value 24 does not exceed the maximum current value of the external power source 18.

Figure 2:
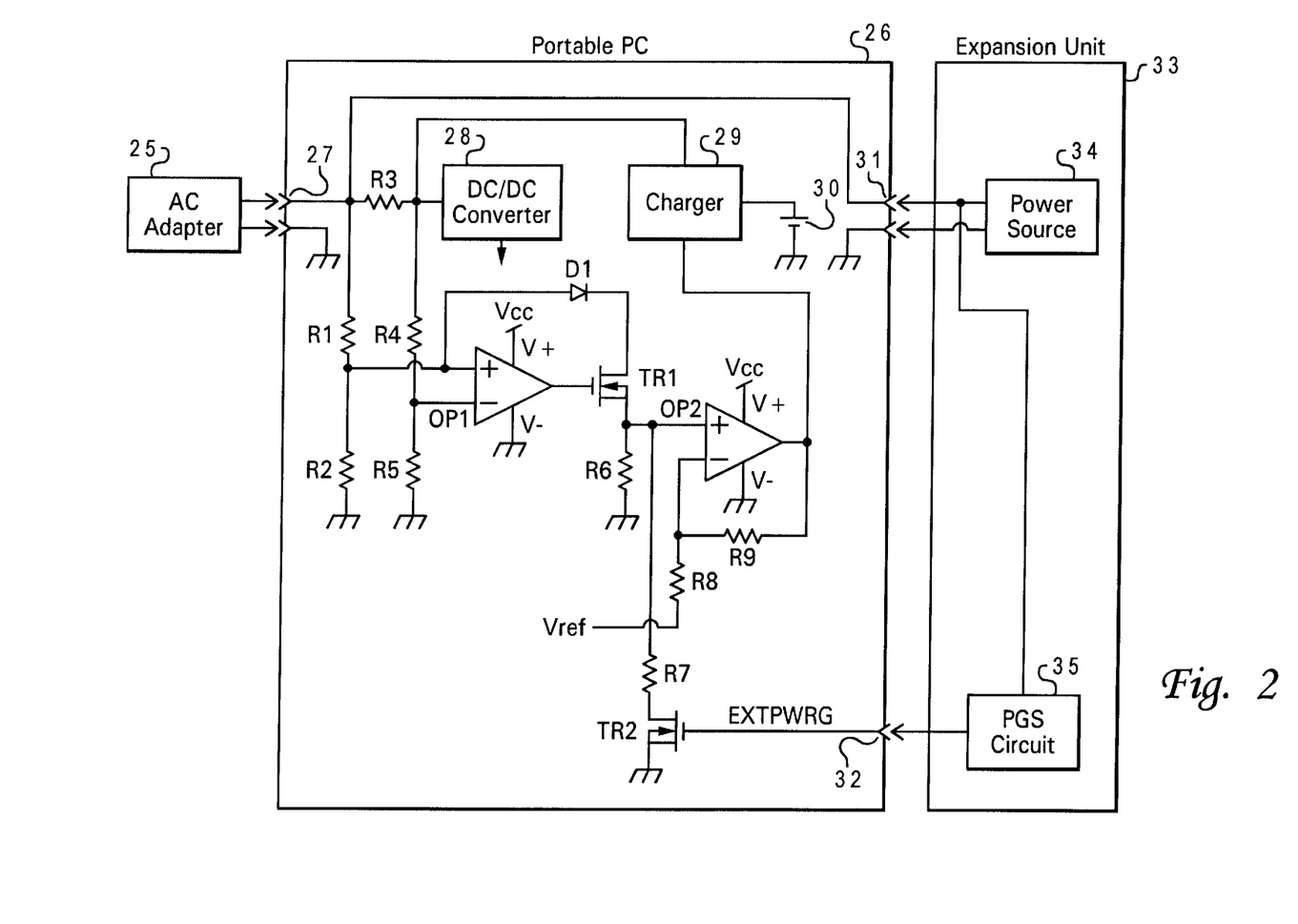
FIG. 2 is a schematic diagram depicting in detail the charging-current controller of FIG. 1.

Referring now to FIG. 2, the charging-current controller of FIG. 1 is depicted in detail. Within a portable PC 26, a charging-current controller realized as an electronic circuit, a DC/DC converter 28, a charger 29, and a rechargeable battery 30 are provided. The portable PC 26 has a plurality of components in addition to these components.

The portable PC 26 receives power supply from an AC adapter 25 and an expansion unit 33. The power supply lines extending from the AC adapter 25 and the expansion unit 33 are connected to resistors R1, R2 connected in series. The above-mentioned power supply lines are connected to the DC/DC converter 28 and the charger 29 through a resistor R3. The output of the DC/DC converter 28 is supplied to each component of the portable PC 26. The charger 29 is connected to the rechargeable battery 30.

Series resistors R4, R5 are connected in parallel with the series resistors R1, R2 through resistor R3. The intermediate point between the series resistors R1, R2 is connected to the positive terminal of an operational amplifier OP1, while the intermediate point between the series resistors R4, R5 is connected to the negative terminal of the operational amplifier OP1.

The output terminal of the operational amplifier OP1 is connected to the gate electrode of an n-channel metal-oxide-semiconductor (MOS) transistor TR1. Between the drain electrode of the transistor TR1 and the positive terminal of the operational amplifier OP1, a diode D1 is connected. Between the source electrode of the transistor TR1 and ground (GND), a resistor R6 is connected.

The intermediate point between the transistor TR1 and the resistor R6 connected in series is connected to the positive terminal of an operational amplifier OP2. The negative terminal of the operational amplifier OP2 is connected to a reference potential $V_{ref}$ through a resistor R8. The output of the operational amplifier OP2 is input to a charger 29. The output of the operational amplifier OP2 is also fed back to the negative terminal thereof through a resistor R9.

In parallel with the resistor R6, a resistor R7 and a transistor TR2 are connected in series. An external power connection signal EXTPWRG output from a power good signal (PGS) circuit 35 provided in an expansion unit 33 is input to the gate electrode of the transistor TR2. The power good signal (PGS) is a signal indicating that the output signal of a power source is within a prescribed voltage range.

The operation of the charging-current controller shown in FIG. 2 is as follows: In the case where the AC adapter 25 is connected to the portable PC 26, if the AC adapter 25 is connected to the portable PC 26, the direct current output by the AC adapter 25 flows into the portable PC 26 through a connector 27. This direct current is passed through the resistor R3 and input to the DC/DC converter 28 and the charger 29. The DC/DC converter 28 converts the input DC voltage to the predetermined DC voltage and then supplies the converted direct current to each component of the portable PC 26. The charger 29 charges the rechargeable battery 30.

The direct current flowing from the AC adapter 25 to the DC/DC converter 28 passes through the resistor R3. The resistor R3, therefore, functions as a sensor resistor for detecting the value of the current flowing from the AC adapter 25. The current flowing from the AC adapter 25 is detected as a voltage across both ends of the resistor R3. With this detected voltage, a voltage difference is produced between the resistor division (resistors R1, R2) on the left side of the resistor R3 and the resistor division (resistors R4, R5) on the right side. This voltage difference is amplified by the operational amplifier OP1 and is input to the gate electrode of the transistor TR1. As a result, the transistor TR1 is turned on and the drain current flows. This drain current is proportional to the voltage across both ends of the resistor R3. Between the transistor TR1 and ground (GND), the resistor R6 is connected. Therefore, the voltage across both ends of the resistor R3, that is, a voltage value, obtained by converting the value of the current flowing from the AC adapter 25 to a voltage from GND, appears on the resistor R6.

The voltage across the resistor R6 is compared with the reference voltage $V_{ref}$. The reference voltage $V_{ref}$ corresponds to the maximum rated current value of the AC adapter 25. That is, during the time the voltage across the resistor R6 is less than the reference voltage $V_{ref}$, the value of the current flowing from the AC adapter 25 is less than the maximum rated current value. At this time, the output voltage of the operational amplifier OP2 maintains a value less than the reference voltage $V_{ref}$.

As the current flowing from the AC adapter 25 becomes larger, the voltage across both ends of the resistor R3 becomes larger. As a result, the voltage across the resistor R6 becomes larger and has a value greater than the reference voltage $V_{ref}$. If the voltage across the resistor R6 becomes larger than the reference voltage $V_{ref}$, the output voltage of the operational amplifier OP2 will become larger than the reference voltage $V_{ref}$. Then, the charger 29 begins to control dead time. The ON-state width of the switching transistor provided in interior of the charger 29 is controlled by the dead time. If the charger 29 controls the dead time, the current for charging the rechargeable battery 30 will vary. This can control the value of the charging current for the rechargeable battery 30 such that it does not exceed the maximum rated current value of the AC adapter 25.

Thereafter, if the power consumption within the portable PC 26 becomes less and the current flowing out from the AC adapter 25 is reduced, then the voltage across the resistor R6 will become less than the reference voltage $V_{ref}$ again. Then, the output voltage of the operational amplifier OP2 becomes less than the reference voltage $V_{ref}$. The charger 29 does not control dead time if the output voltage of the operational amplifier OP2 becomes less than the reference voltage $V_{ref}$. The charger 29, therefore, charges the rechargeable battery 30 with the maximum charging current.

If AC adapter 25 is removed from the portable PC 26 and the expansion unit 33 is attached instead, direct current is supplied from the power source 34, through the connector 31, and to the portable PC 26. In this configuration, the external power connection signal EXTPWRG output by the PGS circuit 35 within the expansion unit 33 is applied to the gate electrode of the transistor TR2 through the connector 32. As a result, the transistor TR2 is turned on. If the transistor TR2 is turned on, the resistor R7 is added in parallel to the resistor R6 and therefore the resistance value between the transistor TR1 and GND becomes less.

Similar to the above-described AC adapter 25 connection, the value of the direct current flowing out from the power source 34 is converted to a voltage value from GND and appears on a parallel resistor consisting of resistors R6 and R7. When the AC adapter 25 is connected to the portable PC 26, the resistor connected to the positive terminal of the operational amplifier OP2 is the resistor R6 alone. When the expansion unit 33 is connected to the portable PC 26, however, the resistor connected to the positive terminal of the operational amplifier OP2 becomes the parallel resistor consisting of resistors R6 and R7. The resistance value of the parallel resistor consisting of resistors R6 and R7 is less than the resistance value of the resistor R6 alone. Therefore, to obtain equal voltage at the positive terminal of the operational amplifier OP2, a larger current can be flowed in the aforementioned parallel resistor than the resistor R6 alone. Therefore, a larger direct current can flow from the power source 34 than the AC adapter 25 until the voltage across the parallel resistor consisting of resistors R6 and R7 becomes the same as the reference voltage $V_{ref}$.

If the voltage across the parallel resistor consisting of resistors R6 and R7 becomes greater than the reference voltage $V_{ref}$, the output voltage of the operational amplifier OP2 will become greater than the reference voltage $V_{ref}$. Then, the charger 29 begins to control dead time. The ON-state width of the switching transistor provided in interior of the charger 29 is controlled by the dead time. If the charger 29 controls the dead time, therefore, the current for charging the rechargeable battery 30 will vary. This can control the value of the charging current for the rechargeable battery 30 such that it does not exceed the maximum rated current value of the power source 34.

Thereafter, if the power consumption within the portable PC 26 becomes less and the current flowing out from the power source 34 is reduced, then the voltage across the parallel resistor consisting of resistors R6 and R7 will become less than the reference voltage $V_{ref}$ again. Then, the output of the operational amplifier OP2 becomes less than the reference voltage $V_{ref}$. The charger 29 does not control dead time if the output of the operational amplifier OP2 becomes less than the reference voltage $V_{ref}$. The charger 29, therefore, charges the rechargeable battery 30 with the maximum charging current.

The charging-current controller according to the first embodiment, as described above, is capable of using the intrinsic power capacities of a plurality of power sources, since when the rechargeable battery is charged, the charging current is controlled according to the value of current supplied from an external power source into an electronic apparatus. As a result, it becomes possible to efficiently charge the rechargeable battery. For instance, consider the case where the power capacity of the AC adapter 25 is 56 W (16V×3.5 A) and the power capacity of the power source 34 incorporated in the expansion unit 33 is 80 W (16V×5.0 A). When the expansion unit 33 is docked, in the prior art, the rechargeable battery 30 can be charged only to 56 W, the power capacity of the AC adapter 25. However, when the expansion unit 33 is docked, in the first embodiment, charging of the rechargeable battery 30 can effectively utilize 80 W that is the power capacity of the power source 34 incorporated in the expansion unit 33.

Second Embodiment

Figure 3:
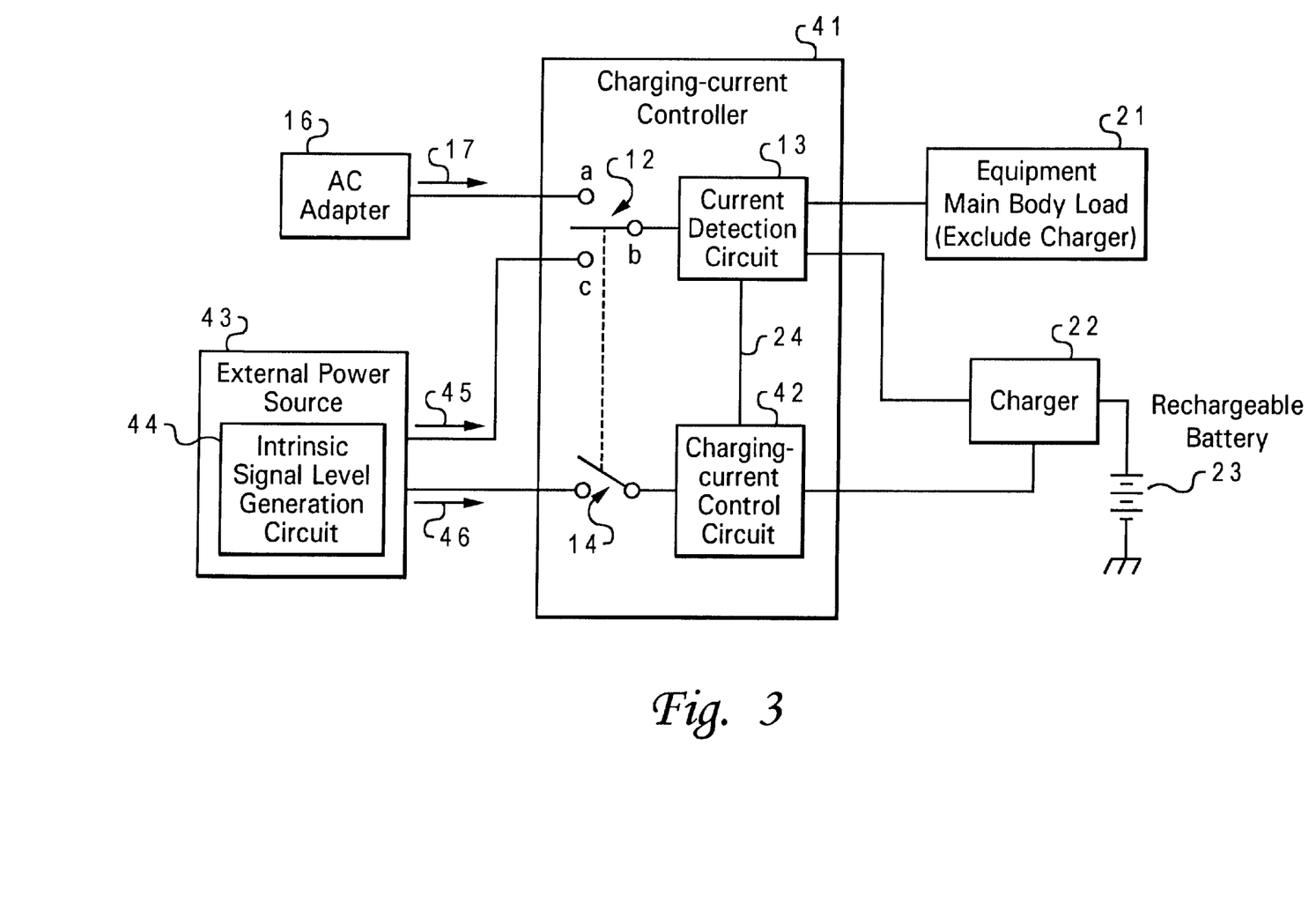
FIG. 3 is a block diagram depicting a portable PC having a charging-current controller in accordance with a second embodiment of the present invention.

Referring now to FIG. 3, a second embodiment of the present invention is depicted. A charging-current controller 41 according to the second embodiment comprises a power path control switch 12, a current detection circuit 13, a signal connection 14, and a charging-current control circuit 42. Since the power path control switch 12, the current detection circuit 13, and the signal connection 14 are the same as those of the first embodiment shown in FIG. 1, their function is as described above.

The function of the charging-current control circuit 42 is to control direct current (charging current), which flows in a charger 22, to an optimal value in accordance with a direct current value detected by the current detection circuit 13. This function is the same as the charging-current control circuit 15 of the first embodiment shown in FIG. 1. The difference between the charging-current control circuit 42 of the second embodiment and the charging-current control circuit 15 of the first embodiment is that a charging-current control signal 46, output by an intrinsic signal level generation circuit 44 provided within an external power source 43, is input to the charging-current control circuit 42 of the second embodiment.

The operation of the charging-current controller 41 is as follows: In the case of connecting an AC adapter 16, the operation is the same as in the first embodiment. If the portable PC is docked to the expansion unit, the power path control switch 12 is set to position c. Simultaneously, the signal connection 14 is closed. As a consequence, direct current 45 is supplied from the external power source 43 to the charging-current controller 41. Simultaneously, the charging-current control signal 46, output by the intrinsic signal level generation circuit 44 incorporated in the external power source 43, is input to the charging-current control circuit 42. In response to the charging-current control signal 46, the charging-current control circuit 42 changes an initial value, which is compared with a current value 24 detected by the current detection circuit 13, to a value indicated by the charging-current control signal 46. The value corresponds to the maximum value of the current flowing from the external power source 43.

Direct current 45, output by the external power source 43, drives a PC load 21 and a charger 22. In this configuration, the current detection circuit 13 detects the current value of the direct current 45 flowing therethrough. The detected current value 24 is transmitted to the charging-current control circuit 42.

The charging-current control circuit 42 controls the value of the charging current of the charger 22 so that the detected current value 24 does not exceed the maximum value of the current flowing out from the external power source 43. The charging-current control circuit 42 has the maximum current value of the external power source 43 as a value changed from the initial value as described above. If the detected current value 24 is less than the maximum current value of the external power source 43, the charging-current control circuit 42 causes the charger 22 to continue to charge the rechargeable battery 23. If the detected current value 24 is approaches the maximum current value of the external power source 43, the charging-current control circuit 15 causes the charger 22 to vary the value of the current charging the rechargeable battery 23, thereby controlling the detected current value 24 so that the value 24 does not exceed the maximum current value of the external power source 43.

Figure 4:
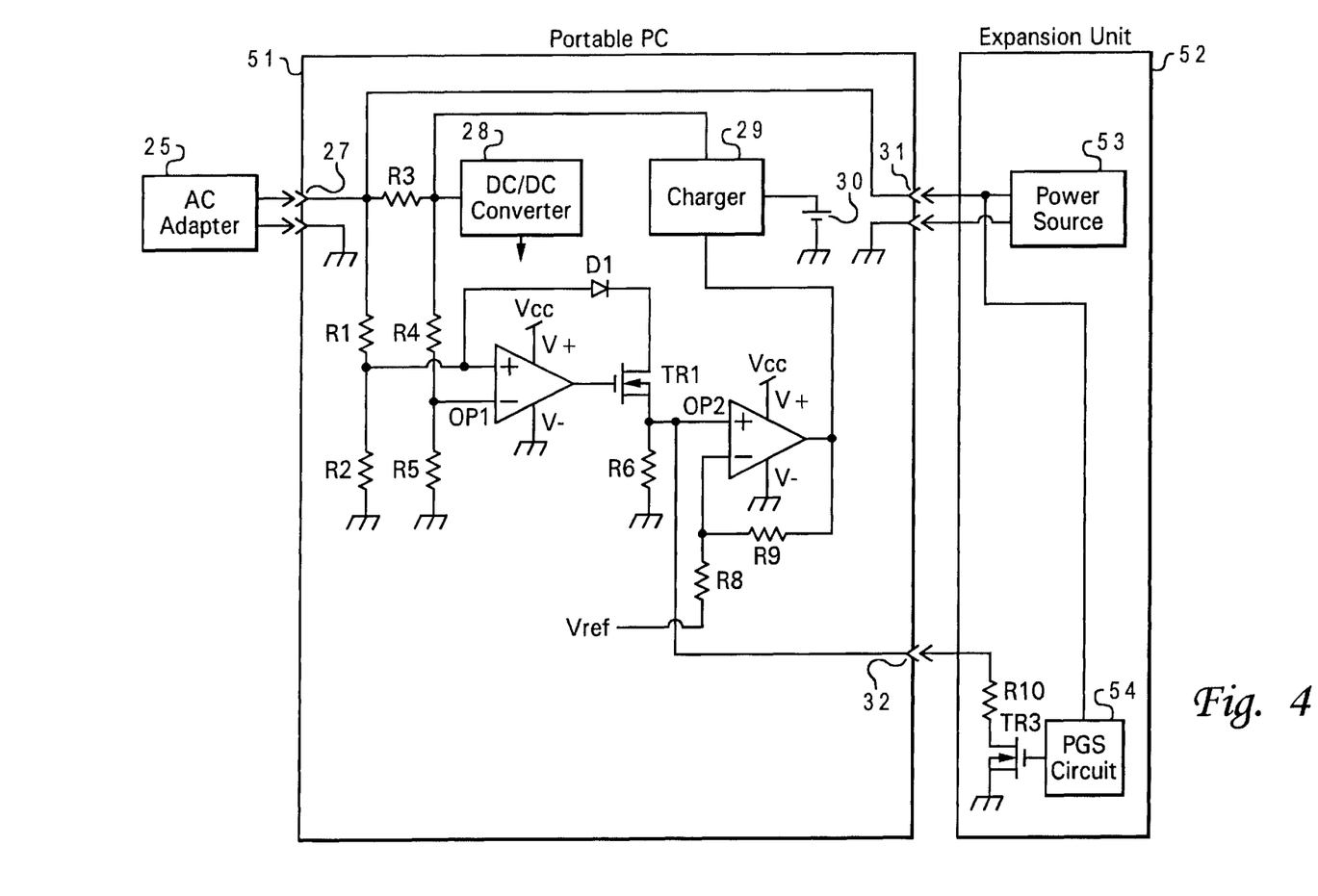
FIG. 4 is a schematic diagram depicting in detail the charging-current controller of FIG. 3.

Referring now to FIG. 4, the charging-current controller of FIG. 3 is depicted in detail. Within a portable PC 51, a rechargeable battery charging-current controller, a DC/DC converter 28, a charger 29, and a rechargeable battery 30 are provided. The portable PC 51 has a plurality of components in addition to these components. Since the electronic circuit, a DC/DC converter 28, the charger 29, and the rechargeable battery 30 are the same as in the first embodiment shown in FIG. 2, the description thereof is the same as that provided for the first embodiment.

The operation of the circuit comprising resistors R1, R2, R3, R4, R5, R6, R8, R9, operational amplifiers OP1, OP2, a diode D1, and a transistor TR1, is the same as the circuit depicted in FIG. 2, described above.

The difference between the second embodiment shown in FIG. 4 and the first embodiment shown in FIG. 2 is that the resistor R7 and the transistor TR2, provided in the first embodiment in parallel with the resistor R6, are removed from the second embodiment. Instead, the second embodiment shown in FIG. 4 is provided within an expansion unit 52 with a series circuit consisting of a resistor R10 and a transistor TR3.

The operation of the charging-current controller according to the second embodiment shown in FIG. 4 is as follows: When an AC adapter 25 is connected to the portable PC 51, the operation is the same as in the first embodiment, described above.

If an expansion unit 52 is attached to the portable PC 51, direct current is supplied from the power source 53, through a connector 31, and to the portable PC 51. In this configuration, the transistor TR3 is turned on by a signal output by a PGS circuit 54 within the expansion unit 52. If the transistor TR3 is turned on, the resistor R10 is added in parallel to the resistor R6 and therefore the resistance between the transistor TR1 and GND decreases.

Similar to the operation of the first embodiment (FIG. 2), the value of the direct current flowing out from the power source 53 is converted to a voltage value from GND and appears on a parallel resistor consisting of resistors R6 and R10. When the AC adapter 25 is connected to the portable PC 26, the resistor connected to the positive terminal of the operational amplifier OP2 is the resistor R6 alone. When the expansion unit 52 is connected to the portable PC 26, however, the resistor connected to the positive terminal of the operational amplifier OP2 becomes the parallel resistor consisting of resistors R6 and R10. The resistance value of the parallel resistor consisting of resistors R6 and R10 is less than the resistance value of the resistor R6 alone. Therefore, to obtain equal voltage at the positive terminal of the operational amplifier OP2, a larger current may flow in the aforementioned parallel resistor than in resistor R6 alone. Therefore, a larger direct current can flow from the power source 53 than the AC adapter 25 until the voltage across the parallel resistor consisting of resistors R6 and R10 becomes the same as the reference voltage $V_{ref}$.

If the voltage across the parallel resistor consisting of resistors R6 and R10 becomes greater than the reference voltage $V_{ref}$, the output voltage of the operational amplifier OP2 will become greater than the reference voltage $V_{ref}$. Then, the charger 29 begins to control dead time. The ON-state width of the switching transistor provided in interior of the charger 29 is controlled by the dead time. If the charger 29 controls the dead time, therefore, the current for charging the rechargeable battery 30 will vary. This can control the value of the charging current for the rechargeable battery 30 such that it does not exceed the maximum rated current value of the power source 53. Thereafter, if the power consumption within the portable PC 51 becomes less and the current flowing out from the power source 53 is reduced, then the voltage across the parallel resistor consisting of resistors R6 and R10 will become less than the reference voltage $V_{ref}$ again. Then, the output of the operational amplifier OP2 becomes less than the reference voltage $V_{ref}$. The charger 29 does not control dead time if the output of the operational amplifier OP2 becomes less than the reference voltage $V_{ref}$. The charger 29, therefore, charges the rechargeable battery 30 with the maximum charging current.

The charging-current controller according to the second embodiment, as described above, is capable of efficiently utilizing the power capacities that a plurality of power sources have, because when the rechargeable battery is charged, the charging current is controlled according to the value of current supplied from an external power source into an electronic apparatus. As a result, it becomes possible to efficiently charge the rechargeable battery. The second embodiment can cope with external power sources having various maximum rated capacity values, because the maximum rated capacity value of the power source 53 incorporated in the expansion unit 52 is stored within the portable PC 51.

While the present invention has been described with reference to use within a portable PC, the invention is not to be limited to the details given herein, but is applicable to various pieces of an electronic apparatus using a rechargeable battery. For instance, the present invention is applicable to game equipment, portable telephone sets, portable information terminals, etc.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A current controller for a battery charger, comprising:
   a power input selectively connectable to one of a plurality of external power sources;
   a charging output coupled to a rechargeable battery;
   a current detector, coupled between said power input and said charging output, for detecting a total current at said power input; and
   a control circuit coupled to said current detector for controlling a charging current supplied from said charging output to said rechargeable battery in response to the connection of a given one of said plurality of external power sources, such said total current is adjusted in conformity with a current capacity of said given external power source.

2. The current controller of claim 1, wherein said current controller further comprises a switch for selectively coupling said power input to said given external power source.

3. The current controller of claim 2, wherein said switch comprises an electronic switch.

4. The current controller of claim 1, wherein said given external power source includes a control output signal for indicating a current capacity of said given external power source, wherein said control circuit further includes a control input that is coupled to said control output signal when said power input is coupled to said given external power source, and wherein said control circuit controls said total current in conformity with said control input.

5. The current controller of claim 1, wherein said current controller further comprises a main body load output coupled to said power input for supplying power to a portable electronic device, and wherein said total current includes a current supplied to said main body load output.

6. The current controller of claim 1, wherein said control circuit further comprises:
   a difference amplifier for determining a difference between said total current and said current capacity; and
   a charger circuit coupled to said difference amplifier for controlling said charging current.

7. A portable personal computer system, comprising:
   a main housing containing a computer subsystem;
   a rechargeable battery within said housing;

a current controller comprising a power input selectively connectable to one of a plurality of external power sources;

a charging output coupled to said rechargeable battery;

a current detector for detecting a total current at said power input; and a control circuit coupled to said current detector for controlling a charging current supplied from said charging output to said rechargeable battery in response to a given one of said plurality of external power sources being coupled, such said total current is adjusted in conformity with a current capacity of said given external power source.

8. The portable personal computer system of claim 7, further comprising a docking station, wherein said given external power source is incorporated within said docking station, wherein said docking station includes a power good indicator signal for indicating that said given external power source is available, and said control circuit further includes a power good input for increasing said charging current in response to said power good signal being connected to said power good input.

9. The portable personal computer system of claim 7, wherein said given external power source is incorporated within a docking station and said switch selects said given power source when said portable personal computer is attached to said docking station.

10. The portable personal computer system of claim 7, further comprising a docking station including a selector signal for indicating that said portable personal computer is docked, said switch comprises an electronic switch, and said selector signal is coupled to said switch for controlling a state of said electronic switch.

11. A method for controlling charging-current used to recharge a battery within a portable personal computer, wherein said method comprises the steps of:

connecting a given one of a plurality of external power sources to a power input of said portable personal computer;

determining which of said plurality of external power sources is connected to said power input;

determining a total current at said input power; and controlling charging-current supplied from said power input to said battery, wherein said total current is adjusted in conformity with a current capacity of said given external power source.

12. The method for controlling charging-current of claim 11, further comprising the step of determining whether or not said portable personal computer is docked to a docking station, and wherein said determining step determines which of said plurality of external power sources is connected in conformity with said determination of whether or not said portable personal computer is docked.

13. The method for controlling charging-current of claim 11, wherein said controlling step further determines a difference between a total current received at said power input and a current capacity of said given external power source and controls said charging-current in conformity with said difference, so that said total current does not exceed said current capacity.

* * * * *